Oct. 12, 1954  C. POTTS  2,691,310
GEAR TRAIN TRANSMISSION
Filed July 28, 1952  3 Sheets-Sheet 1
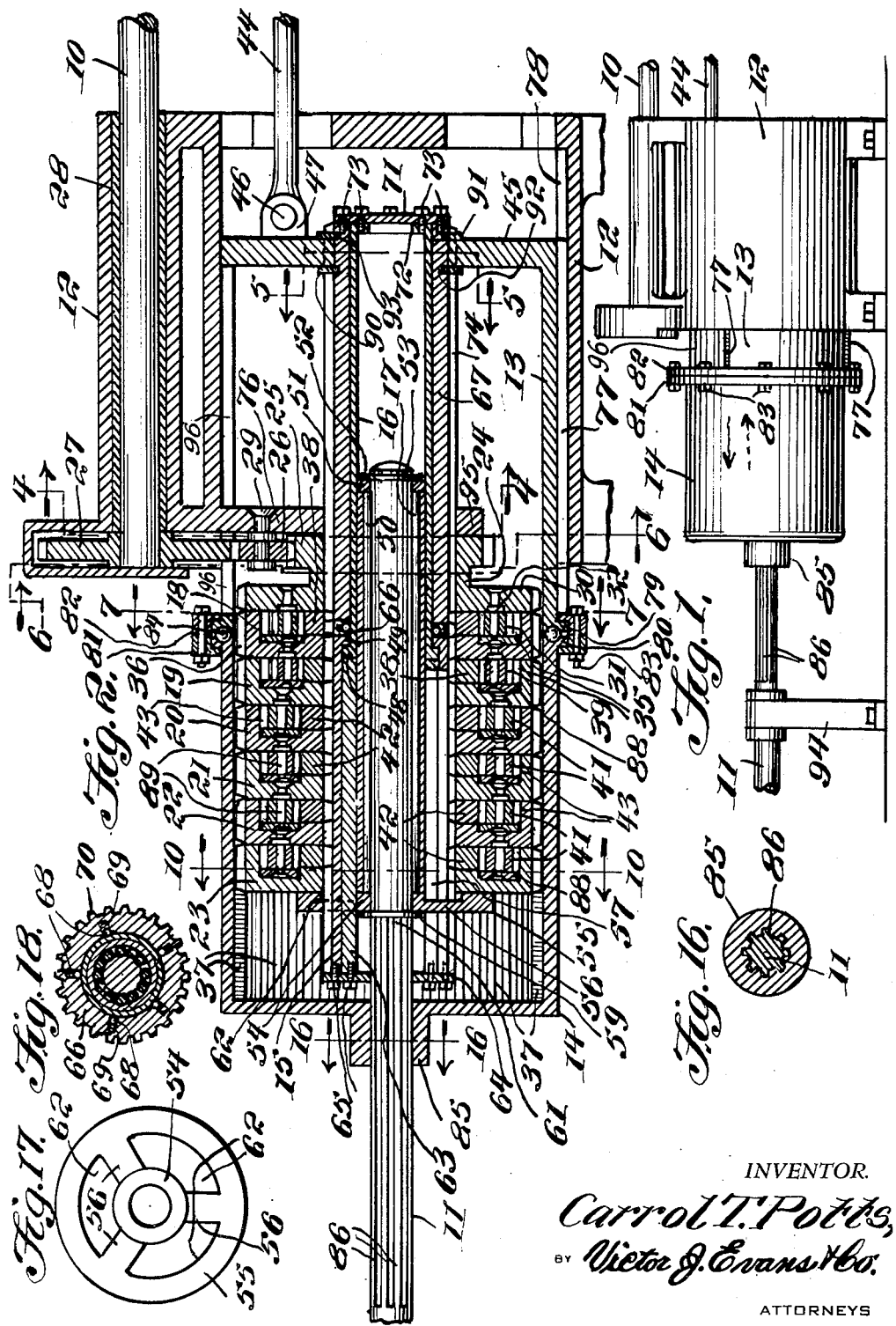
INVENTOR.
Carrol T. Potts,
BY Victor J. Evans & Co.
ATTORNEYS Oct. 12, 1954
C. POTTS
2,691,310
GEAR TRAIN TRANSMISSION
Filed July 28, 1952
3 Sheets-Sheet 2
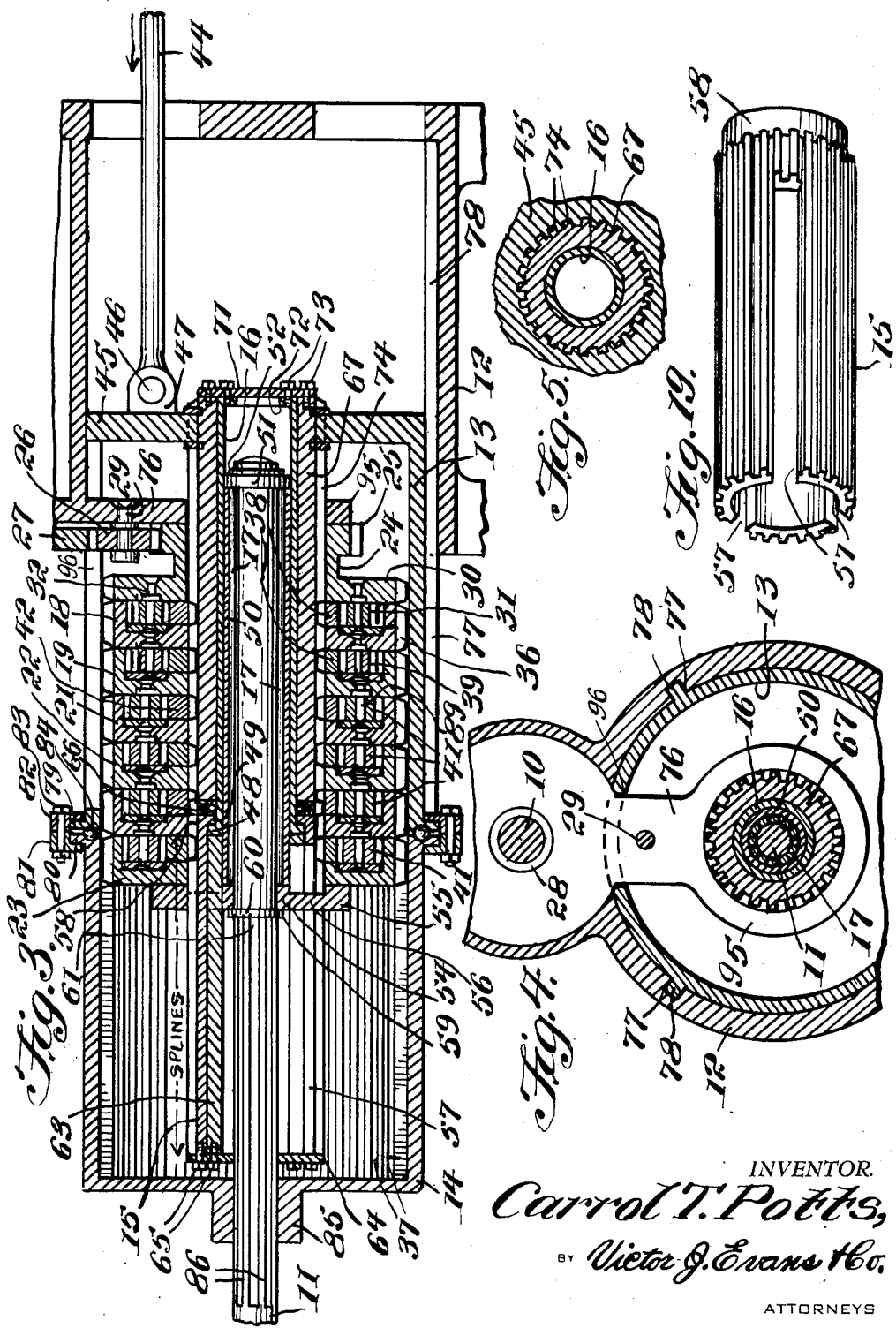
INVENTOR.
Carrol T. Potts,
BY Victor J. Evans & Co.
ATTORNEYS Oct. 12, 1954
C. POTTS
2,691,310
GEAR TRAIN TRANSMISSION
Filed July 28, 1952
3 Sheets-Sheet 3
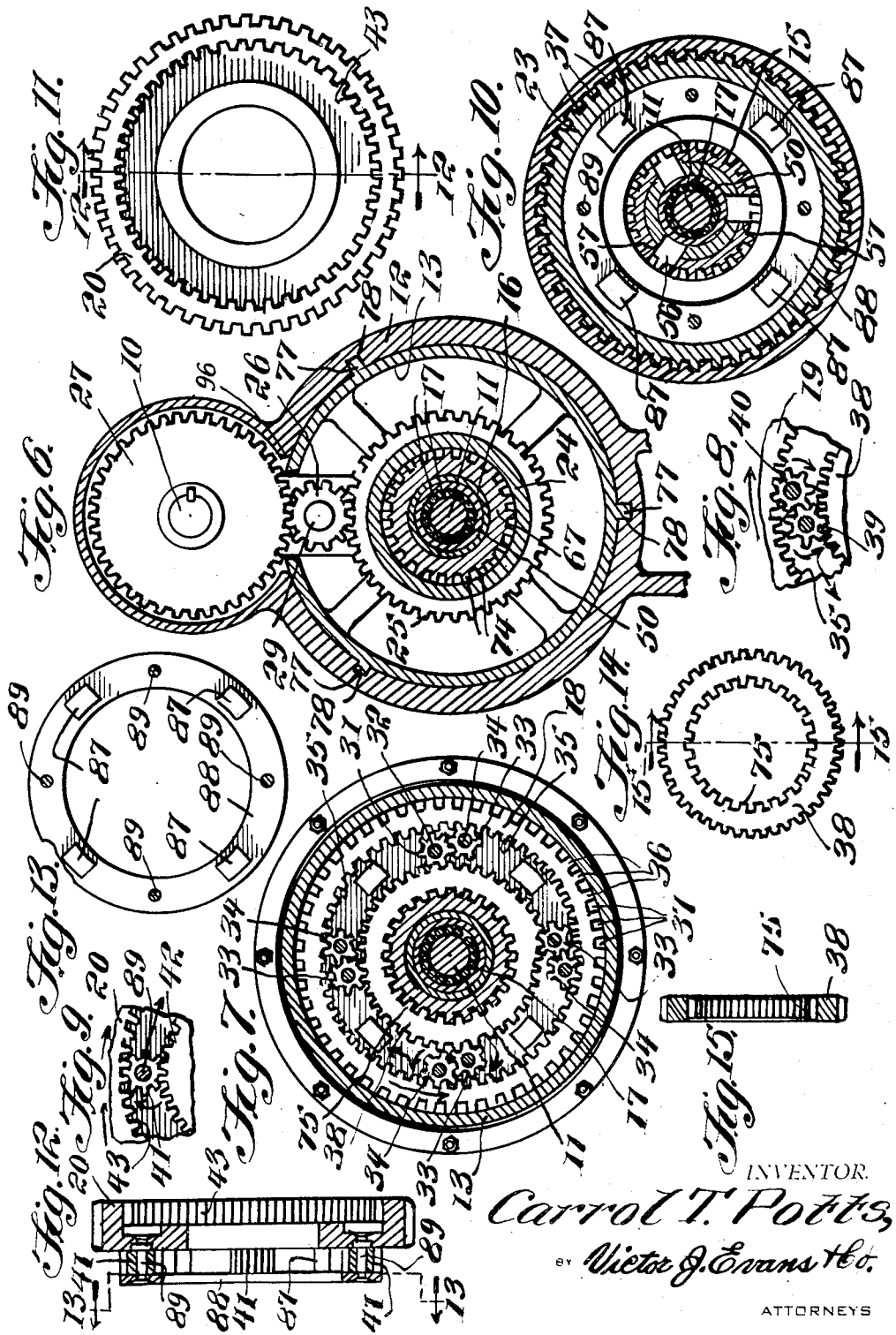
INVENTOR.
Carrol T. Potts,
BY Victor J. Evans & Co.
ATTORNEYS Patented Oct. 12, 1954

2,691,310

UNITED STATES PATENT OFFICE 2,691,310

GEAR TRAIN TRANSMISSION

Carrol Potts, North Weymouth, Mass.

Application July 28, 1952, Serial No. 301,351

6 Claims. (Cl. 74—750)

This invention relates to power transmission devices, and in particular a transmission having a housing with a stationary section into which a drive shaft extends and a rotating section from which a driven shaft extends and wherein the driven shaft may be splined to the rotating section of the housing and the rotating section of the housing is driven through a train of gears with each gear assembly stepping up the speed transmitted thereto from the drive shaft.

The purpose of this invention is to provide a transmission unit wherein the effective speed of a power source can be greatly increased or decreased without proportionate change in power.

Various types of power transmission units have been provided; however, where speed is increased or decreased the power is proportionately increased or decreased and in conventional units of this type where gears are used as the transmission elements it is necessary to shift gears, which is substantially impossible at high speeds. With this thought in mind this invention contemplates a transmission unit including a train of gears or gear assemblies and in which the gears remain in meshing relation continuously.

The object of this invention is, therefore, to provide a power transmitting and speed changing unit where power of a driving shaft is transmitted to a driven shaft through a plurality of planetary gear assemblies with a tubular selector longitudinally slidable between the driven shaft and gears.

Another object of the invention is to provide a power transmission and speed changing unit wherein a sliding tubular selector positioned around the driven shaft is splined to correspond with sun gears of gear assemblies whereby the sun gears are selectively held and released to change the speed transmitted through the unit.

A further object of the invention is to provide a speed transmitting unit between driving and driven shafts with means for selectively engaging gear assemblies with a driven shaft in which the device is provided with reversing gears.

A still further object of the invention is to provide a power transmitting and speed changing unit having a gear train therein wherein the gears remain in mesh continuously in which the unit is of a comparatively simple and economical construction.

With these and other objects and advantages in view the invention embodies a power transmitting unit having a stationary housing into which a drive shaft with a gear on the end thereof extends, a rotating cylindrical section journaled to the stationary section of the housing in which a driven shaft is splined and from which the driven shaft extends, a plurality of gear assemblies in mesh with teeth of the rotating section of the housing and having sun gears splined to a tubular longitudinally slidable selector and operatively connected to the gears with pinions, and means whereby the gears are rotated by the drive shaft to rotate the driven shaft in clockwise and counter-clockwise directions and at different speeds.

Other features and advantages of the invention will appear from the following description taken in connection with the drawings, wherein:

Figure 1 is a side elevational view illustrating the design and general arrangement of the transmitting unit.

Figure 2 is a longitudinal section through the unit showing the selector in the retracted position.

Figure 3 is a view similar to that shown in Fig. 2 showing the selector in the extended position, in which the driven shaft is rotated at high speed.

Figure 4 is a cross section through the unit taken on line 4—4 of Fig. 2 and illustrating an intermediate bearing support of the longitudinally slidable selector.

Figure 5 is a detail showing a section taken on line 5—5 of Fig. 2 illustrating the splines of the selector.

Figure 6 is a cross section taken on line 6—6 of Fig. 2 showing the gears connecting the drive shaft to the gear assemblies.

Figure 7 is a cross section showing the first gear assembly, being taken on line 7—7 of Fig. 2 and illustrating, in particular, the reverse gears.

Figure 8 is a detail illustrating a portion of the second gear assembly wherein the reverse driving elements are changed back into forward driving elements.

Figure 9 is a detail showing a portion of one of the gear assemblies, such as illustrated in Fig. 8 illustrating one of the planetary pinions of the forward drive.

Figure 10 is a cross section taken on line 10—10 of Fig. 2 showing the last gear of the gear train and illustrating the splines of the gears and rotating section of the housing.

Figure 11 is a side elevational view illustrating one of the flange gears of one of the gear assemblies with other parts removed.

Figure 12 is a longitudinal section through the gear shown in Fig. 11, said section being taken on line 12—12 of Fig. 11.

Figure 13 is a view taken on line 13—13 of Fig. 12 showing a mounting rim in which the ends of pins on which pinions of the gear assemblies are mounted are held.

Figure 14 is a detail illustrating one of the sun gears which is splined to the longitudinally slidable selector and on which the pinions of the gear assemblies travel.

Figure 15 is a cross section taken on line 15—15 of Fig. 14 showing a section through the ring gear.

Figure 16 is a cross section taken on line 16—16 of Fig. 2 showing the splined hub of the rotating section of the housing with the driven shaft therein.

Figure 17 is a detail illustrating a spider positioned at the end of the gear assemblies and having openings through which the segments of the splined tubular section of the selector pass.

Figure 18 is a detail illustrating an intermediate washer providing a buffer for providing tension against the sleeve bearing.

Figure 19 is a detail illustrating the splined cylindrical section of the tubular selector and showing the longitudinally disposed slots therein which receive arms of the spider positioned at the end of the gear train.

Referring now to the drawings wherein like reference characters denote corresponding parts the improved power transmission unit of this invention includes a driving shaft 10, a driven shaft 11, a stationary housing 12, a longitudinally slidable cylindrical inner housing section 13, a rotating housing section 14 extended from and journaled in the end of the inner housing section 13, a splined cylindrical selector 15, a bearing sleeve 16, a plurality of flange gears 18, 19, 20, 21, 22 and 23 and a gear unit 24 having a gear 25 at one end that meshes with an intermediate pinion 26 which is driven by a gear 27 on the driving shaft 10.

The driving shaft 10 is journaled in a bearing sleeve 28 in the stationary section 12 of the housing and the gear 27 is fixedly mounted on the inner end of the shaft, as shown in Figs. 2 and 6. The gear 27 meshes with the pinion 26, journaled on a stud 29 and the pinion 26 meshes with the gear 25 of the gear unit 24.

The gear unit 24 is provided with a flange 30 in which pinions 31 are carried and the pinions are journaled on studs 32 mounted in the flange. As illustrated in Fig. 7, the pinions 31 mesh with reversing pinions 33, also carried by the flange 30 on studs 34 and the pinions 33 mesh with the internal gear section 35 of the flange gear 18. The peripheral surface of the flange gear 18 is provided with splines 36 that mesh with corresponding splines 37 in the rotating section 14 of the housing.

With the parts arranged in this manner the pinions 31 are carried by the flange 30 over the sun gear 38 of the gear 18 and with the flange 30 traveling in a clockwise direction, from the position illustrated in Fig. 7 the gear 18 will rotate in a counter-clockwise direction as indicated by the arrow, on the gear shown in Fig. 7.

With the gear 18 rotating in a counter-clockwise direction and carrying pinions 39, similar to the pinions 31 and also pinions 40, similar to the pinions 33, as illustrated in Fig. 8, the gear 19 will rotate in the opposite, or in a clockwise direction.

Each of the gears 19, 20, 21, and 22 carries a plurality of pinions 41, similar to the pinions 31 and, as illustrated in Fig. 9 with the gear carrying the pinions rotating in a clockwise direction and with the pinions, such as the pinions 41 traveling over ring gears 42, similar to the gears 38 with the pinions 41 also meshing with the internal gears 43, such as the gears 35 the following gears will also travel in a clockwise direction and each gear will step up the speed whereby with the selector adjusted longitudinally through the train of gears the speed is increased by moving the selector outwardly of the housing and decreased by moving the selector inwardly of the housing.

The selector is actuated with a shifting rod 44 which is pivotally connected to a head 45 of the cylindrical section 13 with a pin 46 in ears 47. The rod 44 may extend to a foot lever pivotally mounted on the vehicle or to a hand lever on the steering wheel post or instrument board as may be desired.

The spline section 15 of the selector is mounted to slide over the sleeve 16 which is mounted in the head 45 of the inner housing section 13 and, as illustrated in Figs. 2 and 3 the sleeve 16 is provided with an annular flange 48 that is slidably mounted in the selector 15 and the selector is provided with a coacting rim 49 that slides over the outer surface of the sleeve 16. The sleeve 16 is slidably mounted on an outer race or cylinder 50 that is journaled on the shaft 11 with the roller bearings 17. The bearings are secured in position, at the end of the shaft with a washer 51 that is secured in position with a spring ring 52 that extends into an annular recess 53 in the shaft. At the opposite end of the bearing the parts are secured in position by the hub 54 of the spider 55, as shown in Fig. 17, the hub being secured to the rim of the spider with spokes 56 and the spokes being positioned to register with slots 57 which extend longitudinally through the spline section of the selector 15. The opposite end of the selector 15 is provided with a hub 58 that extends beyond the ends of the splines. The spider is secured in position on the shaft 11 with a snap spring ring 59, that snaps into an annular recess 60 at the end of the spline section 61 of the shaft 11.

The segments of the selector 15 extend through openings 62 of the spider 55 and filling strips 63 are positioned inside of the segments of the selector. The strips 63 are secured in position by a disc 64 that is secured to the ends of the segments of the selector 15 and also to the ends of the strips 63 with bolts 65.

A buffer, or washer 66 is provided between the end of the selector 15 and a cylinder 67 on the sleeve 16, the washer 66 being provided with balls 68 actuated by springs 69 which frictionally engage the outer surface of the sleeve 16 to provide tension against the sleeve bearing. The outer surface of the washer 66 is provided with splines or teeth 70 that are aligned with the splines of the selector 15.

The cylinder 67 is retained in position upon the sleeve 16 with an end plate 71 that is secured to the end of the cylinder and also to a flange 72 extended inwardly from the sleeve 16 by bolts 73. The cylinder 67 is also provided with splines, as indicated by the numeral 74, and the splines 74 register with the splines or the selector 15 whereby with the selector moved longitudinally in the unit the internal gear teeth 75 of the gear rings, such as the sun gears 38 mesh with the selector 15 and also with the splines 74 of the cylinder 67. As the housing sections 13 and 14 slide outwardly in the housing 12, the sun gears 38 run off of the splines on to the hub 58 in which position they are free. The sun gears then engage the washer 66, with the speed reducing until they come to a stop as they slide on the splines 74.

With the parts arranged in this manner the selector 15 may be positioned to mesh with each gear assembly, or with only the ring gear of the last gear assembly, or with the sun gears of different gear assemblies depending upon the speed desired, and with the gears continuously in mesh the speed of the driven shaft in relation to the driving shaft is changeable continuously without changing the power transmitted through the unit in conventional proportion to speed.

The cylinder 67 is supported in a bearing 95 which is connected to the stationary section of the housing with a plate 76 in which the stud 29 on which the pinion 26 is journaled is mounted.

The inner sliding section 13 of the housing is provided with keys 77 that extend into keyways 78 in the side of the housing 12 whereby the section 13 is not rotatable.

The section 13 of the housing is also provided with a longitudinally disposed slot, as indicated by the numeral 96, which is positioned to receive the plate 76 and gears 26 and 27 whereby the inner cylinder 13 is free to slide longitudinally over the gears.

The outer end of the section 13 is provided with an annular flange 79 and the rotatable section 14 of the housing is provided with a corresponding flange 80 by means of which the two sections are secured together with rings 81 and 82 which are secured in position over the flanges with bolts 83. Ball bearings 84 are provided in suitable ball races in the faces of the flanges.

The extended end of the rotatable section 14 of the housing is provided with a hub 85 which, as illustrated in Fig. 16 is provided with splines 86 by which the housing section is keyed to the driven shaft 11.

The flange gears are provided with spacing elements 87 which are carried by rings 88, the spacing elements being positioned between the pinions, such as the pinions 41, or the pinions 39 and 40. The rings 88 are secured to the intermediate portions of the gears with studs 89. In the gears 20, 21, 22, and 23 the pinions, such as the pinions 41 are journaled on the studs 89 with which the rings 88 are mounted on the gears.

With the parts arranged in this manner the gear 27 on the end of the driving shaft 10 meshes with the pinion 26 and with the pinion 26 meshing with the gear 25 of the gear unit 24, the flange 30 is rotated, such as in a clockwise direction whereby the pinions 31 being carried over the sun gear 38, as shown in Fig. 7, cause the gear 18 to rotate in a reverse direction, through the pinions 33. With the selector moved longitudinally whereby the section 15 meshes with the teeth of the ring gear of the gear 19 the gear 19 will rotate in a clockwise direction carrying the pinions thereon in a clockwise direction; and as the selector is moved whereby the inner end thereof passes over one gear after another so that the gear meshes with the spline 74 of the cylinder 67, the speed of the driven shaft is continuously increased until the inner end of the selector 15 reaches the final gear assembly.

The cylinder 67 is secured in the head 45 of the inner section 13 of the housing with spring rings 90 and 91 that are positioned against the surfaces of the head and secured in annular grooves 92 and 93, respectively of the cylinder.

A bearing 94 may be provided for supporting the extended end of the driven shaft 11, as shown in Fig. 1, and it will be understood that the shaft may be supported by other suitable means.

It will be understood that modifications, within the scope of the appended claims may be made in the design and arrangement of the parts without departing from the spirit of the invention.

What is claimed is:

1. A transmission unit comprising a stationary housing, a cylindrical housing longitudinally slidable in said stationary housing, said cylindrical housing having an internally splined section rotatably mounted thereon, a driven shaft, a train of gears positioned around said driven shaft, a selector slidably mounted on said driven shaft and positioned to travel through said train of gears, means selectively engaging the selector with gear assemblies of the train of gears, gears of said gear assemblies being positioned in meshing relation with the splines of the rotatable section of the cylindrical housing, a driving shaft, and means operatively connecting said driving shaft with the train of gears.

2. A transmission unit comprising a stationary housing, a cylindrical housing longitudinally slidable in said stationary housing, said cylindrical housing having an internally splined section rotatably mounted thereon, a driven shaft, a train of gears positioned around said driven shaft, said gear trains, including gear units for driving the driven shaft clockwise and also counter-clockwise, a selector slidably mounted on said driven shaft and positioned to travel through said train of gears, means selectively engaging the selector with gear assemblies of the train of gears, gears of said gear assemblies being positioned in meshing relation with the splines of the rotatable section of the cylindrical housing, a driving shaft, and means operatively connecting said driving shaft with the train of gears.

3. A power transmission unit comprising a stationary housing, an inner housing slidably mounted in the stationary housing, a rotating section of the housing journaled on an end of said inner housing, a driven shaft splined in said rotating section of the housing, a sleeve journaled on the driven shaft and slidable longitudinally on said shaft, a selector having a splined outer surface carried by said sleeve, a plurality of gear assemblies positioned to coact with the selector, a driving shaft journaled in the stationary section of the housing, and means operatively connecting the driving shaft to the gear assemblies.

4. A power transmission unit comprising a stationary housing, an inner housing slidably mounted in the stationary housing, a rotating section of the housing journaled on an end of said inner housing, a driven shaft splined in said rotating section of the housing, a sleeve journaled on the driven shaft and slidable longitudinally on said shaft, a selector having a splined outer surface carried by said sleeve, a plurality of gear assemblies positioned to coact with the selector, a driving shaft journaled in the stationary section of the housing, means operatively connecting the driving shaft to the gear assemblies, and means for actuating said selector.

5. A power transmission unit comprising a stationary housing, an inner housing slidably mounted in the stationary housing, a rotating section of the housing journaled on an end of said inner housing, a driven shaft splined in said rotating section of the housing, a sleeve journaled on the driven shaft and slidable longitudinally on said shaft, a selector having a splined outer surface carried by said sleeve, a plurality of gear assemblies positioned to coact with the selector, a driving shaft journaled in the stationary section of the housing, means operatively connecting the driving shaft to the gear assemblies, and means for actuating said selector, said gear assemblies including gears for driving forwardly and in reverse.

6. A power transmission unit comprising a stationary housing, an inner housing slidably mounted in the stationary housing, a rotating section of the housing journaled on an end of said inner housing, a driven shaft splined in said rotating section of the housing, a sleeve journaled on the driven shaft and slidable longitudinally on said shaft, a selector having a splined outer surface carried by said sleeve, a plurality of gear assemblies positioned to coact with the selector, a driving shaft journaled in the stationary section of the housing, means for actuating said selector, said gear assemblies including gears for driving forwardly and in reverse, and means operatively connecting the driving shaft to the gear assemblies.

References Cited in the file of this patent

FOREIGN PATENTS

| Number | Country | Date |
|---|---|---|
| 22,172 | Great Britain | Sept. 30, 1912 |
| 17,547 | Great Britain | Dec. 15, 1915 |
| 116,917 | Great Britain | June 24, 1918 |